(12) United States Patent
Kostrzewa et al.

(10) Patent No.: US 12,435,352 B2
(45) Date of Patent: Oct. 7, 2025

(54) MASS SPECTROMETRIC MEASUREMENT OF β-LACTAMASE RESISTANCES

(75) Inventors: Markus Kostrzewa, Lilienthal (DE); Karsten Michelmann, Bremen (DE); Katrin Sparbier, Bremen (DE)

(73) Assignee: Bruker Daltonics GmbH & Co. KG, Bremen (DE)

( * ) Notice: Subject to any disclaimer, the term of this patent is extended or adjusted under 35 U.S.C. 154(b) by 0 days.

(21) Appl. No.: 13/582,372

(22) PCT Filed: Jun. 10, 2011

(86) PCT No.: PCT/EP2011/059670
§ 371 (c)(1),
(2), (4) Date: Dec. 26, 2012

(87) PCT Pub. No.: WO2011/154517
PCT Pub. Date: Dec. 15, 2011

(65) Prior Publication Data
US 2013/0095511 A1 Apr. 18, 2013

(30) Foreign Application Priority Data
Jun. 11, 2010 (DE) ............. 10 2010 023 452.4

(51) Int. Cl.
C12Q 1/18 (2006.01)
C12Q 1/34 (2006.01)
G01N 33/68 (2006.01)

(52) U.S. Cl.
CPC ............... C12Q 1/18 (2013.01); C12Q 1/34 (2013.01); G01N 33/6851 (2013.01);
(Continued)

(58) Field of Classification Search
CPC ............... C12Q 1/18; G01N 33/6851
(Continued)

(56) References Cited

U.S. PATENT DOCUMENTS 6,120,986 A * 9/2000 Martin
2005/0089947 A1 4/2005 Black et al.
(Continued)

FOREIGN PATENT DOCUMENTS

CN 101603051 A * 12/2009
CN 102033102 4/2011
(Continued)

OTHER PUBLICATIONS

Dargis et al., Use of biotinylated beta-lactams and chemiluminescence for studying of penicillin-binding proteins in bacteria, Antimicrobial Agents and Chemotherapy, May 1994, p. 973-980.*
(Continued)

*Primary Examiner* — Louise W Humphrey
*Assistant Examiner* — Rachel Emily Martin
(74) *Attorney, Agent, or Firm* — Benoît & Côté Inc.

(57) ABSTRACT

The invention relates to the determination of resistances of microorganisms which produce β-lactamases, in particular "extended spectrum β-lactamases" (ESBL). The invention provides a method whereby the microbial resistance can be measured very simply and quickly by means of the catalytic effect of the microbially produced β-lactamases on β-lactam antibiotics, which consists in a hydrolytic cleavage of the β-lactam ring. The method determines the resistance of the bacteria a few hours after a suitable substrate, either a β-lactam antibiotic or a customized β-lactam derivative, has been added to a suspension of the microbes, by direct mass spectrometric measurement of the substrate breakdown caused by the β-lactamases.

11 Claims, 1 Drawing Sheet

(52) U.S. Cl.
CPC ... *G01N 2333/986* (2013.01); *G01N 2800/26* (2013.01); *G01N 2800/44* (2013.01)

(58) Field of Classification Search
USPC .......................................... 435/4, 32; 506/10
See application file for complete search history.

(56) References Cited

U.S. PATENT DOCUMENTS

| | | | |
|---|---|---|---|
| 2008/0009029 A1* | 1/2008 | Govorun et al. | |
| 2010/0227767 A1* | 9/2010 | Boedicker ............ | G01N 33/542 506/7 |
| 2011/0012016 A1 | 1/2011 | Maier et al. | |
| 2011/0245105 A1* | 10/2011 | Citri | |

FOREIGN PATENT DOCUMENTS

| | | | |
|---|---|---|---|
| CN | 103003699 | 3/2013 | |
| DE | 69825896 T2 * | 9/2005 | ............ C12N 11/00 |
| DE | 102006021493 | 11/2007 | |
| DE | 102009033368 | 1/2011 | |
| GB | 2438066 | 11/2007 | |
| WO | 2006088381 | 8/2006 | |
| WO | 2010067358 | 6/2010 | |

OTHER PUBLICATIONS

Cohen et al., Small molecule analysis by MALDI mass spectrometry, Anal. Bioanal. Chem., 2002, 373:571-586.*
Affinity-Purification, Thermo Scientific website, Jan. 14, 2010.*
Ji et al., Identification of Streptothricin Class Antibiotics in the Early stage of Antibiotics Screening by Electrospray Ionization Mass Spectrometry, Journal of Antibiotics, 61(11):660-667, 2008.*
Neu, Structure-Activity Relations of New beta-Lactam Compounds and in Vitro Activity Against Common Bacteria, Reviews of Infectious Diseases, vol. 5, Supplement 2, 1983.*
Rathore et al. Extending matrix-assisted laser desorption/ionization triple quadruple mass spectrometry enzyme screening assays to targets with small molecule substrates, Rapid Communications in Mass Spectrometry, 23:3293-3300, 2009.*
Kitchen et al, Time-Dosage Relation in Penicillin Therapy With Special Reference to YAWS, Bull. World Health Org., 8, 77-89, 1953.*
PVMM, Penicillin Veterinary Merck Manual, 2012.*
Lidgard et al, Utility of Matrix-assisted Laser Desorption/Ionization Time-of-flight Mass Spectrometry for the Analysis of Low Molecular Weight Compounds, Rapid Communications in Mass Spectrometry, vol. 9, 1995, pp. 128-132.*
Liesener et al., Monitoring enzymatic conversions by mass spectrometry: a critical review, Anal. Bioanal. Chem, 2005, 382:1451-1464.*
PubChem Azactam, https://pubchem.ncbi.nlm.nih.gov/compound/Monobactam (Year: 2022).*
Ling, Y-C, et al. Quantitative Analysis of Antibiotics by Matrix-assisted Laser Desorption/Ionization Time-of-flight Mass Spectrometry, 1998, Rapid Communications in Mass Spectrometry, 12: 317-327 (Year: 1998).*
Hathout, Y. et al. Identification of Bacillus Spores by Matrix-Assisted Laser Desorption Ionization-Mass Spectrometry, 1999, Applied and Environmental Microbiology, 65(10): 4313-4319 (Year: 1999).*
Tadros, M. et al. Rapid detection of resistance to carbapenems and cephalosporins in Enterobacteriaceae using liquid chromatography tandem mass spectrometry, 2018, PLoS One, 13(11): 1-10 (Year: 2018).*
PubChem Ampicillin, https://pubchem.ncbi.nlm.nih.gov/compound/Ampicillin (Year: 2024).*
Abcam His-tag, https://www.abcam.com/content/his-tag (Year: 2024).*
Saves et al., "Mass spectral kinetic study of acylation and deacylation during the hydrolysis of penicillins and cefotaxime by beta-lactamase TEM-1 and the G238S mutant", Biochemistry, vol. 34, No. 37, 1995, pp. 11660-11667.
Aplin et al, "Use of electrospray mass spectrometry to directly observe an acyl enzyme intermediate in beta-lactamase catalysis", Febs Letters, Elsevier, vol. 277, No. 1-2, 1990, pp. 212-214.
Fenselau et al., "Identification of Lactamase in Antibiotic-Resistant Bacillus cereus Spores", Applied and Environmental Microbiology, vol. 74, No. 3, 2007, pp. 904-906.
Keseru et al., "Identification of beta-lactamases in human and bovine isolates of *Staphylococcus aureus* strains having borderline resistance to penicillinase-resistant penicilians (PRPs) with proteomic methods", Veterinary Microbiology, Elsevier, vol. 147, No. 1-2, 2011, pp. 96-102.
Ikryannikova et al: "A Maldi Tof Ms-Based Minisequencing Method for Rapid Detection of Tem-Type Extended-Spectrum Beta-Lactamases in Clinical Strains of Enterobacteriaceae", Jouranl of Microbiological Methods, vol. 75, No. 3, Dec. 1, 2008, pp. 385-391.
Chinese Office Action dated Sep. 5, 2014.
Ohkawa et al., "The Isolation Frequency of B-Lactamase-Producing Fungus from Acute Uncomplicated Cystitis Patient", Proceedings of Urinology, Nov. 1987, vol. 33, No. 11, p. 1800-1805.
Niu et al., "SanJ, an ATP-dependent picolinate-CoA ligase, catalyzes the conversion of picolinate to picolinate-CoA during nikkomycin biosynthesis in Streptomyces ansochromogenes", Metab. Eng., May 2006, vol. 8, No. 3, p. 183-195.
Welling et al., "Determination of enzyme activity by high-performance liquid chromatography", J. Chromatogr. B. Biomed. Appl., Sep. 1994, vol. 659, No. 1-2, p. 209-225.
Lewis et al., "A point mutation leads to altered product specificity in beta-lactamase catalysis", Proc. Natl. Acad. Sci. USA, Jan. 1997, vol. 94, No. 2, p. 443-447.
Liesener and Karst, "Monitoring enzymatic conversions by mass spectrometry: a critical review", Anal Bioanal Chem., 382(7), pp. 1451-1464, Aug. 2005 (Aug. 2005).
Gao et al., "Novel fluorogenic substrates for imaging beta-lactamase gene expression", J Am Chem Soc., 125(37), pp. 11146-11147, Sep. 2003 (Sep. 2003).
Yazama et al., "Inactivation of kanamycin A by phosphorylation in pathogenic Nocardia", Microbiol Immunol., 35(1), pp. 39-48, 1991.
Mosher et al., "Inactivation of chloramphenicol by O-phosphorylation. A novel resistance mechanism in Streptomyces venezuelae ISP5230, a chloramphenicol producer", J Biol Chem., 270(45), pp. 27000-27006, Nov. 1995 (Nov. 1995).
CA Office Action dated Oct. 18, 2013.
Jung et al., "Acetylation of fluoroquinolone antimicrobial agents by an *Escherichia coli* strain isolated from a municipal wastewater treatment plant", J. Appl. Microbiol., Feb. 2009, vol. 106, No. 2, p. 564-571.
Japanese Office Action dated Apr. 14, 2015.
Leriche et al., "An experimental comparison of electrospray ion-trap and matrix-assisted laser desorption/ionization post-source decay mass spectra for the characterization of small drug molecules", Rapid Commun. Mass Spectrom., Aug. 2001, vol. 15, No. 8, pp. 608-614, ISSN 0951-4198.
Japanese Office Action dated Nov. 5, 2015.

* cited by examiner

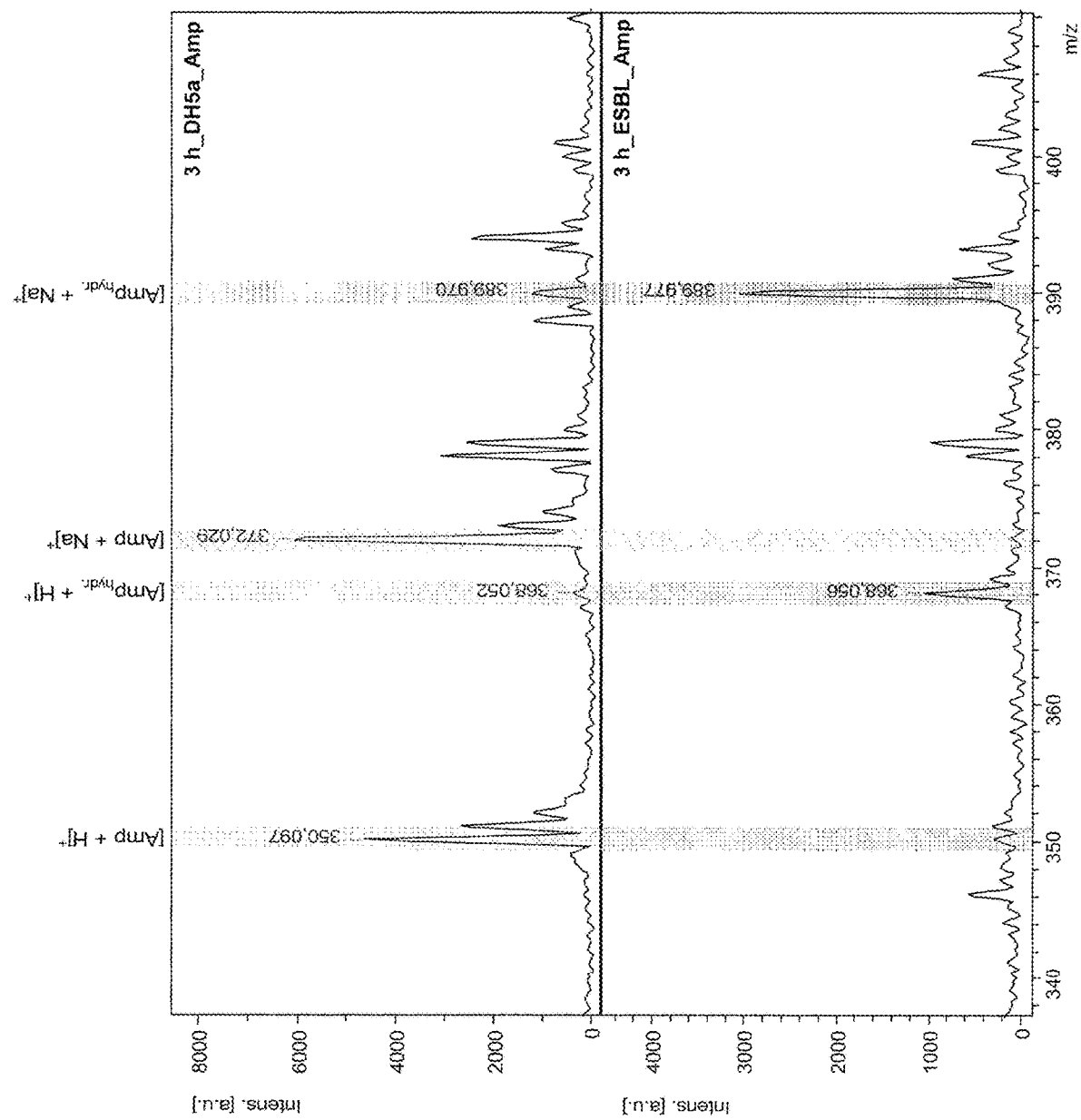

MASS SPECTROMETRIC MEASUREMENT OF β-LACTAMASE RESISTANCES

PRIORITY INFORMATION

This patent application claims priority from PCT patent application PCT/EP2011/059670 filed Jun. 10, 2011, which claims priority to German patent application 10 2010 023 452.4 filed Jun. 11, 2010, both of which are hereby incorporated by reference.

FIELD OF INVENTION

The invention relates to the determination of the resistance of bacteria producing β-lactamases, including "extended spectrum β-lactamases" (ESBL).

BACKGROUND OF THE INVENTION

Many types of microbe, particularly bacteria and unicellular fungi, can be quickly and easily be identified mass spectrometrically by transferring small quantities of microbes from a colony cultivated in the usual way on or in a nutrient medium, onto a mass spectrometric sample support plate, where they are prepared with a solution of a matrix substance and mass spectrometrically measured after ionization by matrix-assisted laser desorption. The mass spectrum represents masses and intensities of characteristic proteins if they are present in the microbes in sufficient concentration. This spectrum, which shows peaks of around 40 to 80 proteins of the microbes each time, is used to determine their identity by similarity analyses with thousands of reference spectra in corresponding spectral libraries. The term "identification" here denotes a taxonomic classification, i.e., the determination of family, genus and species. Research is being carried out at many locations to collate libraries which are reliable and legally approvable for medical use (so-called "validated" libraries) with reference spectra of thousands of microbes.

This method of identifying microbes has proven to be extraordinarily successful in studies as well as in the daily routine in many microbiological laboratories. It is fast, low cost and has very low error rates, far lower than conventional microbiological identification methods. Special versions of these methods can be used to identify not only the microbe species, but often also the subspecies and sometimes even the individual strains, if these differ in terms of the masses or intensities of the more frequent and thus mass spectrometrically detectable proteins. For a more detailed description see the U.S. Published patent application US 2011/0012016 A1, for example, which presents not only a detailed explanation of the method but also a more refined identity search.

The identification of microbes plays a special role for infectious diseases, particularly for a sepsis. Here it is important to be able to identify the species of pathogen very quickly in order to apply the correct medical treatment immediately. Mass spectrometric identification has been tried and tested in such cases also, and is currently on the way to gaining acceptance in clinical and microbiological laboratories.

In the medical field, however, there is not only the problem of a fast identification, but also the problem of detecting resistances to the commonly used antibiotics. Rapid disease control is not possible without knowing the resistances. It is therefore necessary to not only make a quick identification, but also to quickly determine and characterize the resistances of microorganisms. Some species of microbe are known to be almost completely resistant to certain antibiotics, so there is no point in determining the resistance after a precise identification. In most cases, however, a species has strains which are non-resistant, as well as those which are slightly and, in particular, highly resistant, with different resistances to different types of antibiotic. It is therefore essential to determine type and strength of the resistance.

It seems to be obvious to use mass spectrometers not only for taxonomic identification but, beyond this, for determining the resistances of microbes, particularly bacteria, to certain antibiotics. This task has proven to be very difficult, however. Although the resistances must also be expressed by the presence of new or modified proteins, it has so far not proven possible to identify them directly in the protein profile measured mass spectrometrically. Of the hundreds or even thousands of proteins of the microbes, only 40 to 80 are measured in the mass spectrum, after all. The resistance must therefore be determined indirectly. A first attempt at such a resistance determination is presented in the document U.S. Published patent application 2008/0009029; but this method has not gained acceptance. The method is essentially based on a change in the protein profiles caused by cell death after the addition of antibiotics, or on the determination of a cessation in growth compared to resistant reference microbes.

The term antibiotic resistance categorizes characteristics of microorganisms (here predominantly bacteria) which allow them to weaken or completely neutralize the effect of antibiotically active substances. Resistances are now widespread; in the USA around 70% of the infectious germs acquired in hospitals are resistant to at least one antibiotic. Patients are often infected with bacterial strains which are resistant to several antibiotics (multiple resistance). So-called problem germs are the methicillin-resistant *Staphylococcus aureus* (MRSA), *Pseudomonas* spec., *Escherichia coli* with ESBL resistance and *Mycobacterium tuberculosis*. Estimates by the CDC (Center for Disease Control and Prevention) assume two million infections were acquired in hospitals in the USA in 2004, with around 90,000 deaths, far higher than the number of deaths caused by road accidents, or deaths caused by household or industrial accidents.

In everyday usage the term antibiotics usually means medications or pharmaceutical products for the treatment of bacterial infectious diseases. The great success of antibiotics in medicine started with penicillin. The success of penicillin, but also the appearance of the first resistances, led researchers to search for and to discover many more antibiotics: streptomycin, chloramphenicol, aureomycin, tetracycline and many others. Most antibiotics known today derive from natural substances. Colloquially, penicillin is now a synonym for antibiotics.

Penicillin is a β-lactam antibiotic. These β-lactams bind to the penicillin-binding protein (PBP), a peptidoglycan transpeptidase, which is responsible for the formation of the peptide bonds for strengthening the cell walls. The bonds between the β-lactams and the PBP cause the PBP to become ineffective. The lack of sufficient quantities of effective PBP causes lesions in the cell wall as the bacteria are growing; the membrane thus loses the control of its permeability and can no longer regulate the cytoplasm concentration. After a short time the bacterium becomes nonviable. Under extreme conditions, literally 'bursting' bacteria cells can be observed in the laboratory. This is the way how β-lactams act as bactericides.

Since the first applications of penicillin, bacteria have increasingly developed different types of resistances. An important type of bacterial resistance to β-lactams consists in the formation of enzymes (β-lactamases), which catalytically break open the β-lactam ring by hydrolysis and thus render it ineffective. More than 340 variants of β-lactamases are currently known, formed by many types of bacteria. They can be divided into different classes according to their general structure or how they act. The genetic information for the synthesis of the enzyme, which is initially produced by mutations, is inherited by chromosomes or plasmids. The plasmidal information can be transferred between bacteria by various mechanisms, even between bacteria of different species by contact ("horizontal transfer"). Depending on the action of the β-lactamases a distinction is made between penicillinases and cephalosporinases, but there are further classes. The catalytic effect of these enzymes means that a small amount of β-lactamases is sufficient to destroy large quantities of β-lactam antibiotics.

Today there exists a large number of derivatives of the β-lactam antibiotics, among them several penicillins (benzylpenicillins, oral penicillins, aminopenicillins, isoxazolyl penicillins, acylaminopenicillins), cephalosporins, monobactams and carbapenems. These are usually derivatized with larger chemical groups in order to sterically hinder the β-lactamases. Extended spectrum β-lactamases (ESBL), in turn, can cleave a wide variety of antibiotics containing β-lactam. The ESBL were formed initially by spot mutations on a β-lactamase. The genes for the ESBL are on plasmids, which can be transferred horizontally from bacterium to bacterium.

ESBL-carrying bacteria are resistant to penicillins, cephalosporins (generation 1-4) and to monobactams. It is mainly *E. coli* and *Klebsiellae* (Gram-negative bacteria) which carry ESBL genes, but microbiologists are watching the rapid spread of this ESBL resistance with great anxiety. In addition to the methicillin resistance of *Staphylococcus aureus* (MRSA), ESBL is one of the most worrying concerns of infection research.

β-lactamase inhibitors are one tool against β-lactamases, being administered together with β-lactams in order to weaken the effect of β-lactamases which are present in the bacterium. Established combinations are clavulanic acid+amoxicillin, sulbactam+ampicillin, tazobactam+piperacillin. Not all combinations have the optimum effect. These tools should only be used after a careful identification of the bacteria and careful determination of their resistance, because it can be expected that this tool will also very quickly become blunt again.

In the 1970s and 1980s there was still a great deal of research activity in the field of antibiotics. Today the development of new antibiotics has greatly diminished, although antibiotics are among the most commonly prescribed drugs in the world; with a thirteen percent market share they form the largest individual segment of the pharmaceuticals we use. Of the 8,000 or so antibiotic substances known today, only around 80 are used therapeutically, mainly due to side effects but also because of the costs of approval. In Germany in 2005, a total of 2,775 antibiotics were approved, according to the German Federal Institute for Drugs and Medical Devices (BfArM), but only covering the about 80 antibiotic substances.

As time goes on, the problem of microorganisms being resistant to antibiotics such as bactericides or fungicides is becoming more and more urgent. On the one hand, the speed with which microorganisms form resistance to different types of antibiotic is increasing; on the other hand, fewer and fewer new antibiotics for medical applications are being developed. Since many new antibiotics have to be taken off the market after a short time due to ineffectiveness, it is less and less profitable for pharmaceutical companies to invest heavily in the increasingly difficult development of new antibiotics. According to the WHO, between 1990 and 2005 only three new antibiotic active substances were launched, compared to ten between 1940 and 1950, and five between 1971 and 1980.

The reasons for the rapid increase in resistances are manifold: irresponsible prescribing of antibiotics, even when not necessary; treatments with bactericides which are irresponsibly broken off before the infective agent is completely destroyed; irresponsible, often purely preventative usage in agriculture and animal husbandry. All these practices assist in the selection and spreading of the resistant microbe species compared to the non-resistant species.

Celebrated in the middle of the last century as the great hope in the fight against infectious diseases, antibiotics are quickly becoming a blunt tool. The only hope of preventing this is through targeted applications with treatments which have to be fully completed, and this requires fast identification of the infectious pathogens as well as rapid identification of their specific resistances to the different types of antibiotic.

There is a need for a method whereby a β-lactamase resistance of microbes, bacteria in particular, to different types of β-lactam antibiotics can be mass spectrometrically determined.

SUMMARY OF THE INVENTION

The invention provides a method whereby a microbial resistance due to β-lactamases can be very easily and quickly measured with a mass spectrometer. The method determines the resistance of the bacteria a few hours after the microbes have been brought together with an appropriate substrate, either a β-lactam antibiotic or a customized β-lactam derivative, by a direct mass spectrometric measurement of the hydrolytic attack of the β-lactamases on the substrate. The catalytic effect of the bacterially produced β-lactamases on the substrate causes the β-lactam ring to hydrolytically split open. The amount of substrate decreases, and the hydrolyzed cleavage product appears instead, its mass being 18 atomic mass units heavier.

The enzymatic cleavage reaction is quite rapid; provided it is not hindered by the gradual lack of substrate, it takes roughly between one and a hundred milliseconds per molecular reaction, with characteristic differences for the different β-lactamases. Measurement of the reaction speed provides initial information on type and strength of the β-lactamases.

In principle the measurement can be carried out with any mass spectrometer, but it is especially favorable to use the same MALDI time-of-flight mass spectrometer which was used for the identification of the bacteria. Since the MALDI process (ionization by matrix-assisted laser desorption) for the ionization of substances in the lower mass range of a few hundred atomic mass units generates a very strong chemical background, it is favorable to use substrates which lie in the regions with low background. This can be done by producing customized substrates with molecular weights between 700 and 1,200 atomic mass units. It is also advantageous to increase the proton affinity of the substrates in order to increase their degree of ionization. Nevertheless it is often advantageous to be able to use higher concentrations of the substrate to increase the sensitivity. In order that a high bactericidal effect of a high concentration does not kill the bacteria immediately, the substrates can be customized in such a way that their antibiotic effect, i.e., their MIC value, is relatively small. MIC is the "minimum inhibitory concentration" for inhibition by β-lactamase inhibitors in the presence of the corresponding antibiotic, and serves as a measure of the strength of the resistance, and also of the strength of the antibiotic.

An advantageous embodiment of a substrate is given by covalently bonding a 6-His tag to a β-lactam, for example. A 6-His tag includes a chain of six histidine molecules, increases the molecular mass by around 800 atomic mass units, improves the proton affinity, and also makes it possible to extract the substrate and its cleavage product in pure form from the reaction liquid. This extraction can, for example, be carried out with the aid of commercially available magnetic beads on which there is a chelate loaded with nickel ions which reversibly binds the 6-His tag. A MALDI sample preparation can then be carried out, whose matrix substance contains the remaining substrate and its cleavage product in a strongly enriched and purified form and therefore allows a very sensitive measurement.

In particular it is possible to develop specific multiplex resistance assays with the introduction of several different types of substrate, the different substrates being customized in such a way and introduced in such concentrations that their breakdown pattern makes it possible to identify the class and also the strength of action of the β-lactamases. The substrates can imitate the accessibility to the β-lactam ring of the different groups of antibiotics, for example.

These and other objects, features and advantages of the present invention will become more apparent in light of the following detailed description of preferred embodiments thereof, as illustrated in the accompanying drawings.

BRIEF DESCRIPTION OF THE DRAWINGS

The top mass spectrum in FIG. 1 shows the effect of admixing ampicillin with the molar mass of 349.41 atomic mass units to a suspension of the DH5a strain of E. coli, which has no resistance. There is no breakdown of either the ampicillin (here mass 350 atomic mass units) or the sodium salt of ampicillin (mass 372 atomic mass units). The bottom mass spectrum, in contrast, shows the effect of an ESBL-resistant strain of E. coli on ampicillin and its sodium salt: both are broken down to the hydrolyzed products of masses 368 and 390 atomic mass units.

DETAILED DESCRIPTION OF THE INVENTION

The invention provides a very simple and fast method of determining microbial resistances based on the generation of β-lactamases by the microbes, particularly by bacteria.

The method basically adds one or more suitable substrates to a suspension of the bacteria. The substrates can be either β-lactam antibiotics or preferably customized β-lactam derivatives. If the bacteria have a β-lactamase resistance, at least one substrate is broken down by the β-lactamase under suitable incubation conditions in minutes to hours, by hydrolytically opening the β-lactam ring. This hydrolytic breakdown of the substrate by the β-lactamases can be directly measured mass spectrometrically. The amount of substrate decreases, and is replaced by the hydrolyzed cleavage product, whose mass is 18 atomic mass units heavier.

In FIG. 1 this breakdown, occurring only when a resistance exists, is shown using the β-lactam antibiotic ampicillin in two mass spectra. The top mass spectrum shows the result of admixing ampicillin with a molar mass of 349.41 atomic mass units to a suspension of the DH5a strain of E. coli. This strain has no resistance. Therefore, no breakdown of either the ampicillin (visible here at the mass of 350 atomic mass units), or the sodium salt of ampicillin (at mass 372 atomic mass units) is observed. The bottom mass spectrum, in contrast, shows the effect of an ESBL-resistant strain of E. coli on ampicillin and its sodium salt: both are broken down to the hydrolyzed products of masses 368 and 390 atomic mass units.

Ampicillin is a semi-synthetic, antibiotically active pharmaceutical from the group of β-lactam antibiotics (penicillins). It is known as a broad-spectrum antibiotic due to its effectiveness against Gram-positive pathogens and some Gram-negative rods. In chemical terms ampicillin is an aminopenicillin.

As with all β-lactam antibiotics, the bactericidal (bacteria-killing) effect of ampicillin is based on the blocking of an enzyme, D-alanin transpeptidase, which is present in different bacteria in different forms. This enzyme is necessary for the formation of a new and firm cell wall in the division or growing phase of the bacteria. These transpeptidases are also called penicillin-binding proteins (PBP). The blocking takes place by attachment, the β-lactam ring representing the attachment motif. The attachment prevents the new synthesis of rigid cell walls. The cells are therefore unable to divide, but live on initially until their growth leads to a sufficiently high number of cell wall lesions to cause the death of the cell. Division and growth of human cells is not impeded, however, because human cells have only a cell membrane, but no cell wall, and have therefore no corresponding transpeptidase.

In the example shown in FIG. 1, 10 microliters of ampicillin solution with a concentration of 10 milligrams per milliliter of water were added to an Eppendorf test tube. Three colonies were picked from the bacteria to be tested, and these were resuspended in the 10 microliters of ampicillin solution. The vessels were then incubated for three hours at 37° Celsius under agitation. After incubation, they were centrifuged for two minutes at 13,000 revolutions per minute in order to separate off the cells. The remaining ampicillin and the hydrolyzed reaction product are now in the supernatant.

In principle, the measurement can be carried out with any mass spectrometer, but it is especially favorable to be able to use the same MALDI time-of-flight mass spectrometer which was used for the identification of the bacteria. To this end 1.5 microliters from the supernatant were applied onto the mass spectrometric sample support. After drying, the samples were coated with one microliter of a matrix solution. The matrix used was α-cyano-4-hydroxycinnamic acid (HCCA) in a concentration of 10 milligrams per milliliter in a mixture of water, 50% acetonitrile and 2.5% trifluoroacetic acid. After drying again, a mass spectrum was acquired from this preparation in the MALDI time-of-flight mass spectrometer in the usual way. The concentration of the ampicillin used as the substrate for this example is extraordinarily high, more than a thousand times higher than would be necessary for a therapeutic treatment. The fact that this quantity of ampicillin is broken down shows the extraordinary effectiveness of the extended spectrum β-lactamases (ESBL). It can hardly be assumed that the bacteria will survive at this high concentration for a long time; however, the small amount of β-lactamase expelled during their life time is sufficient to catalytically split the large amount of substrate. The high concentration was chosen so that the signals could be seen clearly above the high chemical background which exists in this mass range. The concentration could be a factor of 100 lower if a substrate in the mass range of around 800 to 1000 atomic mass units could be used, achievable by customized substrates with higher molecular weights.

It is also advantageous to increase the proton affinity of the substrates in order to increase the ionization yield. The β-lactams with their low masses do not have a high proton affinity; only small proportions of them are therefore ionized in the ionization process. The sensitivity can be increased further by a factor of 10 by inserting amino acids with high proton affinity, for example.

Nevertheless it is often advantageous to use higher substrate concentrations to further increase the sensitivity. But to prevent those bacteria with less strong β-lactamases being killed immediately by a high bactericidal effectiveness, the substrates can be customized in such a way that their antibiotic effect, i.e. their MIC value, is relatively small. The effectiveness of the antibiotic usually already decreases with increasing size of the molecules, because they are greatly hindered from penetrating through the pores in the cell wall into the bacteria.

It is, furthermore, advantageous to customize the substrates in such a way that they can be completely and easily extracted from the supernatant. To this end they can be provided with anchor groups whereby immobilized partners can be used to extract them. The attachment of a biotin group to the substrate is described here as a first example. Both the substrate and the breakdown product can then be extracted from the supernatant by streptavidin which is immobilized at the walls. Since the bond between biotin and streptavidin is reversible, the substrate and its breakdown product can be processed further and measured after being enriched in the known way. Suitable vessels whose interior walls are coated with streptavidin are commercially available, as are coated microparticles, such as magnetic beads.

A particularly advantageous embodiment of an extractable substrate is given by covalently bonding a 6-His tag to a β-lactam, for example. A 6-His tag includes six histidine molecules, increasing the molecular weight by around 800 atomic mass units, improving the proton affinity, and offering an easy procedure for the extraction of the substrate and its cleavage product from the reaction liquid. This extraction can be performed with magnetic beads, for example. Magnetic beads which are coated with chelates are commercially available. These chelates can be loaded with nickel ions. The nickel ions bind reversibly to the 6-His tags. This makes it easy to carry out a MALDI sample preparation in the known way, the samples containing only the remaining substrate and its cleavage product in a purified form, imbedded in crystals of the matrix substance, and allows a very sensitive measurement.

The enzymatic cleavage reaction of the β-lactamases is quite rapid; provided it is not hindered by the gradual lack of substrate, it takes roughly between one and a hundred milliseconds per molecular reaction. The characteristic differences in the reaction speeds of the different β-lactamases can be measured and provide information on the strength of the β-lactamase present, and thus also an indication as to the type of the β-lactamase. In the most favorable case, the reaction speed can be measured in a single mass spectrum. If the incubation is stopped after exactly half an hour, for example, the ratio of the remaining substrate to the breakdown product can be used to read off the reaction speed if the method is calibrated accordingly.

A further advantageous embodiment includes using several different customized substrates in a single multiplex resistance assay. The substrates can, for example, be provided with different types of steric hindrances for the attack of the β-lactamases, as are present in the different antibiotics. From the breakdown pattern and breakdown speed one can then draw conclusions as to the type of the β-lactamases and the effectiveness of different types of antibiotic. By using suitable substrates and choosing the right concentrations, it is possible to determine how effective the β-lactamases are. A simple example for the simultaneous breakdown of two substrates (ampicillin and its sodium salt) is depicted in FIG. 1, although no tailored substrates with different resistances against breakdown were used in this case.

The measurement of the microbial resistance can, in particular, also be used for microbes which can be obtained in pure foorm from blood or blood cultures, as explained in DE 10 2009 033 368 A1 (T. Maier; WO 2011/006911 A3), for example.

Instead of an ionization by matrix-assisted laser desorption (MALDI) in a MALDI time-of-flight mass spectrometer, it is of course possible to use other types of ionization, such as electrospray ionization (ESI), and other types of mass spectrometer, such as time-of-flight mass spectrometers with orthogonal ion injection (OTOF), ion cyclotron resonance mass spectrometers (ICR-MS), electrostatic Kingdon mass spectrometers or, in particular, low-cost ion trap mass spectrometers, to analyze the breakdown of the substrate. Those skilled in the art are familiar with all these mass spectrometers and ionization methods, so we will forego detailed explanations here.

A particularly suitable option for measuring the breakdown of the substrate and the increase of the breakdown product is a triple quad mass spectrometer, which essentially only makes a comparative measurement of substrate and breakdown product. This triple quad mass spectrometer can achieve extremely high sensitivity so that very small quantities of substrate are sufficient for this method.

In order to simplify the determination of the resistance, some or all of the materials required can be provided in sterile packs of consumables (kits). In particular, the consumable packs can contain exact quantities of customized substrates and, where necessary, also corresponding matrix substances. They can additionally contain mass spectrometric disposable MALDI sample supports. The packs of consumables can be produced commercially.

The mass spectra can be evaluated visually, but also by means of suitable computer programs. It is particularly possible to develop and use programs for the evaluation of the multiplex resistance assays. These programs can immediately determine the type and strength of the microbes' β-lactamase resistance from the breakdown pattern and provide suggested treatments.

Although the present invention has been illustrated and described with respect to several preferred embodiments thereof, various changes, omissions and additions to the form and detail thereof, may be made therein, without departing from the spirit and scope of the invention.

What is claimed is:

1. A method for the determination of a β-lactam resistance of microbes based on the production of β-lactamases by the microbes, the method comprising:
obtaining the microbes from a colony cultivated on a nutrient medium or from a blood culture;
combining the microbes with a β-lactam antibiotic covalently bonded to a 6-His tag in a solution, wherein β-lactamases of the microbes may cause hydrolytic breakdown of the β-lactam antibiotic;

extracting remaining 3-lactam antibiotic and/or its breakdown product from the solution via a reversible bond of the 6-His tag to an extracting partner;

partly applying the extracted remaining-lactam antibiotic and/or breakdown product to a mass spectrometric support; and measuring an enzymatic breakdown of the β-lactam antibiotic by the β-lactamases of the microbes mass spectrometrically by acquiring a mass spectrum of the extracted remaining β-lactam antibiotic and/or breakdown product using a time of flight mass spectrometer with ionization by matrix-assisted laser desorption, wherein a matrix used is α-cyano-4-hydroxycinnamic acid.

2. The method according to claim 1, wherein the β-lactam antibiotic has a molecular weight between 700 and 1200 atomic mass units.

3. The method according to claim 1, wherein the microbes are combined with different types of β-lactam antibiotics in a single multiplex resistance assay and the breakdown of the different types of β-lactam antibiotics is measured simultaneously.

4. The method according to claim 3, wherein the different types of β-lactam antibiotics are customized such that their breakdown pattern makes it possible to identify the different classes of β-lactamases.

5. The method according to claim 4, wherein the different types of β-lactam antibiotics are derivatized with different chemical groups around the β-lactam antibiotic to imitate the steric forms of different antibiotics.

6. The method according to claim 1, wherein the β-lactam antibiotic is one of penicillins, benzylpenicillins, oral penicillins, aminopenicillins, isoxazolylpenicillins, acylaminopenicillins, cephalosporins, monobactams and carbapenems.

7. The method according to claim 1, wherein the β-lactam antibiotic is ampicillin combined with sulbactam, amoxicillin combined with clavulanic acid or piperacillin combined with tazobactam.

8. The method according to claim 1, wherein the concentration of the β-lactam antibiotic in the solution is dosed such that the microbes will not survive and that mass spectrometric signals of the antibiotic and the breakdown product are recognizable above a chemical background.

9. A method for the determination of a β-lactam resistance of microbes based on the production of β-lactamases by the microbes, the method comprising:

obtaining the microbes from a colony cultivated on a nutrient medium or from a blood culture;

combining the microbes with a β-lactam antibiotic covalently bonded to a 6-His tag in a solution, wherein β-lactamases of the microbes may cause hydrolytic breakdown of the β-lactam antibiotic;

extracting remaining-lactam antibiotic and/or its breakdown product from the solution via a reversible bond of the 6-His tag to an extracting partner;

partly applying the extracted remaining β-lactam antibiotic and/or breakdown product to a mass spectrometric support; and measuring the enzymatic breakdown of the β-lactam antibiotic by the β-lactamases of the microbes mass spectrometrically by acquiring a mass spectrum of the extracted remaining β-lactam antibiotic and/or breakdown product using ionization by matrix-assisted laser desorption, wherein a matrix used is α-cyano-4-hydroxycinnamic acid.

10. The method according to claim 9, wherein the concentration of the β-lactam antibiotic in the solution is dosed such that the microbes will not survive and that mass spectrometric signals of the antibiotic and the breakdown product are recognizable above a chemical background.

11. A method for the determination of a β-lactam resistance of microbes based on the production of β-lactamases by the microbes, the method comprising:

obtaining the microbes from a colony cultivated on a nutrient medium or from a blood culture;

combining the microbes with a substrate in a solution, said substrate comprising a β-lactam ring;

partly applying the solution to a mass spectrometric support; and measuring an enzymatic breakdown of the substrate by the β-lactamases of the microbes mass spectrometrically by acquiring a mass spectrum of remaining substrate and breakdown product, which are embedded in crystals of a matrix substance, using a time of flight mass spectrometer with ionization by matrix-assisted laser desorption, wherein the breakdown product comprises a mass which is 18 atomic mass units heavier than the substrate and wherein the matrix used is α-cyano-4-hydroxycinnamic acid.

\* \* \* \* \*

UNITED STATES PATENT AND TRADEMARK OFFICE
CERTIFICATE OF CORRECTION

PATENT NO. : 12,435,352 B2  
APPLICATION NO. : 13/582372  
DATED : October 7, 2025  
INVENTOR(S) : Markus Kostrzewa, Karsten Michelmann and Katrin Sparbier Page 1 of 1

It is certified that error appears in the above-identified patent and that said Letters Patent is hereby corrected as shown below:

In the Claims

On Claim 1, Column 9, 3rd Line, it reads:  
..."extracting remaining 3-lactam antibiotic"...  
Should read:  
..."extracting remaining β-lactam antibiotic"...

On Claim 9, Column 10, 10th Line, it reads:  
..."extracting remaining-lactam antibiotic"...  
Should read:  
..."extracting remaining β-lactam antibiotic"...

Signed and Sealed this  
Twenty-fifth Day of November, 2025

John A. Squires  
*Director of the United States Patent and Trademark Office*